(12) United States Patent
Gamboa

(10) Patent No.: US 9,512,864 B2
(45) Date of Patent: Dec. 6, 2016

(54) METHOD AND SYSTEM FOR CONFORMING ASSEMBLY SYSTEMS TO CONTOURS OF CURVED SURFACES

(71) Applicant: The Boeing Company, Chicago, IL (US)

(72) Inventor: James Darryl Gamboa, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 1171 days.

(21) Appl. No.: 13/775,870

(22) Filed: Feb. 25, 2013

(65) Prior Publication Data

US 2014/0237793 A1    Aug. 28, 2014

(51) Int. Cl.
*F16B 5/12* (2006.01)
*F16B 47/00* (2006.01)
*B23Q 9/00* (2006.01)

(52) U.S. Cl.
CPC ............... *F16B 5/12* (2013.01); *B23Q 9/0042* (2013.01); *F16B 47/00* (2013.01);
(Continued)

(58) Field of Classification Search
CPC ....... B25B 1/2468; B26D 7/20; A47B 57/567; A47B 63/00; A47B 63/065
See application file for complete search history.

(56) References Cited

U.S. PATENT DOCUMENTS 1,707,207 A     3/1929  Bianchi et al.
4,129,328 A *  12/1978  Littell .................. B65G 47/918
                                                                294/65
(Continued)

FOREIGN PATENT DOCUMENTS

CN          1617785 A     5/2005
CN        101578157 A     1/2009
(Continued)

OTHER PUBLICATIONS

International Search Report and Written Opinion of the International Searching Authority for PCT/US2014/012874 (counterpart to U.S. Appl. No. 13/775,870), May 26, 2014, European Patent Office.
(Continued)

*Primary Examiner* — Lee D Wilson
(74) *Attorney, Agent, or Firm* — Smith Moore Leatherwood LLP

(57) ABSTRACT

Methods and systems for configuring a manual and/or automated processing system to conform to a contoured surface of a structure are disclosed. One example includes an automated processing system with a flexible rail configuration. One or more turnbuckles and/or other actuators configure and hold the flexible rail configuration into conformity with the surface (which could be flat or of a curvature) during processing by the automated processing system. Additionally, one or more combination suction-cup pressurized-air devices may be coupled to the flexible rail configuration for selectively attaching the flexible rail configuration to the contoured surface and also for selectively releasing and/or facilitating elevation and movement of the flexible rail configuration above and about the contoured surface. A multi-function end effector may be associated with the flexible rail configuration and be moveable relative thereto.

20 Claims, 9 Drawing Sheets

(52) U.S. Cl.
  CPC ... *B23Q 2210/008* (2013.01); *Y10T 29/49817* (2015.01); *Y10T 403/24* (2015.01)

(56) References Cited

U.S. PATENT DOCUMENTS

| | | | | |
|---|---|---|---|---|
| 4,527,783 | A * | 7/1985 | Collora | B23Q 1/032 269/21 |
| 5,700,187 | A | 12/1997 | Balbi et al. | |
| 7,048,618 | B1 | 5/2006 | Cramer | |
| 2004/0234352 | A1 | 11/2004 | Vanderpol et al. | |
| 2012/0228092 | A1 | 9/2012 | Erlbacher | |
| 2014/0237793 | A1 * | 8/2014 | Gamboa | B23Q 9/0042 29/426.2 |
| 2014/0353894 | A1 * | 12/2014 | DesJardien | B23P 19/10 269/21 |

FOREIGN PATENT DOCUMENTS

| | | |
|---|---|---|
| DE | 117634 A1 | 1/1976 |
| DE | 4315101 A1 | 11/1994 |
| NL | 8401651 A | 12/1985 |
| WO | WO2008091314 | 7/2008 |

OTHER PUBLICATIONS

U.S. Appl. No. 13/663,838, filed Oct. 30, 2012.
U.S. Appl. No. 13/663,805, filed Oct. 30, 2012.
Chinese Office Action dated Jul. 19, 2016 for counterpart Chinese Application No. 201480009661.9.

* cited by examiner

METHOD AND SYSTEM FOR CONFORMING ASSEMBLY SYSTEMS TO CONTOURS OF CURVED SURFACES

FIELD

The present disclosure relates generally to methods and configurations for conforming processing systems to contours of surfaces. More specifically, certain aspects of the disclosure relate to methods and systems for conforming automated processing systems used during aircraft manufacturing to contours of curved work surfaces.

BACKGROUND

Manual and/or automated processing systems may be used in the aerospace industry as well as in other manufacturing sectors, for fabricating various components, assemblies, and/or sub-assemblies. These manufacturing systems or devices may be configured to move relative to the surfaces of components being fabricated. For example, in aircraft manufacturing, manual and automated processing systems may be able to move relative to flat and contoured work surfaces and may be configured to be accurately positioned at a location where processing, such as machining, is to be performed. Similarly, a processing system may be positioned at a location, e.g., for drilling, reaming, and/or tapping a hole, and for subsequently installing a fastener therein.

As stated, such processing systems may be used to fabricate components having curved surfaces, such as a fuselage, wing, or other non-planar portions of an aircraft. Accordingly, flexible structures or tracks may be used for supporting certain processing systems.

However, even though automated processing systems may be configured to move relative to the surfaces of components being processed along one or more flexible tracks, these tracks have finite length that may limit the effective operating range of the system. Accordingly, upon completion of the processing to be done in a particular working area, the automated processing system and its flexible track must be removed from one location and repositioned to another location if additional processing at that location is desired. The repositioning procedure may require numerous time-consuming and labor-intensive manual repositioning and set-up operations since, in applications where the working surface is contoured, it may be necessary and/or desirable to accommodate the contour of the surface as the automated processing system is relocated. More specifically, when repositioning and setting up the processing system over a work surface, it may be necessary to manually apply forces to the ends of the flexible tracks to create contact between the work surface and coupling devices (such as vacuum cups), used to attach the structure to the work surface. Such repeated manual set-up steps of the processing system at different locations along the work surface may be time-consuming, manpower-intensive, expensive, and/or involve other difficulties.

Additionally, if a processing system is provided with positioning devices for moving the processing system away from the work surface, due to lack of rigidity, flexible tracks or other support structures may present challenges during movement of the processing system.

Further limitations and disadvantages of conventional and traditional approaches may become apparent to one of skill in the art, through comparison of such systems with teachings and examples set forth in the present disclosure.

SUMMARY

It would be desirable to provide a system, apparatus, and method that address at least some of the issues discussed above, as well as other potential issues. Moreover, it would be beneficial to furnish a method and apparatus for conforming processing systems to contours of curved work surfaces in an automated manner that reduce the required set-up time and labor.

Accordingly, a system, apparatus and/or method is disclosed for conforming processing systems to contours of curved work surfaces in an automated manner, substantially as shown in and/or described in connection with at least one of the figures, as set forth more completely in the claims.

Examples of the present disclosure are generally directed to a system, an apparatus, and a method for conforming automated processing systems used during manufacturing to contours of curved work surfaces.

In one example implementation, an apparatus is disclosed for use in connection with a processing system on a surface having a contour, and includes an elongated flexible component having a first portion and a second portion. An actuatable component is movable between a first position and a second position and has a first portion and a second portion. A first bracket has a first portion and a second portion spaced from the first portion of the first bracket, wherein the first portion of the actuatable component is connected to the first portion of the first bracket, and the first portion of the elongated flexible component is generally fixedly connected to the second portion of the first bracket for movement with and flexure with respect to the first bracket. A second bracket has a first portion and a second portion spaced from the first portion of the second bracket, wherein: the second portion of the actuatable component is connected to the first portion of the second bracket; the second portion of the elongated flexible component is generally fixedly connected to the second portion of the second bracket for movement with and flexure with respect to the second bracket; the actuatable component is configured to induce relative movement between the first bracket and the second bracket upon the actuatable component moving between the first position and the second position; and the elongated flexible component is configured to flex into a contour upon the relative movement between the first bracket and the second bracket. And, an actuator is provided that selectively moves the actuatable component between the first position and the second position.

In another example, the actuatable component, the first bracket, the second bracket, and the elongated flexible component are configured such that upon the actuatable component moving between the first position and the second position, the first portion of the first bracket and the first portion of the second bracket move apart from one another, and the second portion of the first bracket and the second portion of the second bracket move towards one another. Or, the first portion of the first bracket and the first portion of the second bracket move towards one another, and the second portion of the first bracket and the second portion of the second bracket move apart from one another.

In another example, the first and second portions of the actuatable component are generally rigid, and a turnbuckle is threadingly connected to both the first portion and the second portion of the actuatable component and wherein the turnbuckle is is configured, upon selective rotation thereof, to simultaneously move the first portion and the second portion outwardly relative to the turnbuckle or inwardly relative to the turnbuckle, wherein the first portion and the second portion of the actuatable component are generally rigid. A motor can be drivingly connected to the turnbuckle for selectively rotating the turnbuckle.

In a further implementation, the first portion of the actuatable component includes a first fluid-actuated piston-cylinder device having a rod connected to selectively move the first portion of the first bracket towards or away from the first portion of the second bracket. And, the second portion of the actuatable component including a second fluid-actuated piston-cylinder device having a rod connected to selectively move the first portion of the second bracket towards or away from the first portion of the first bracket.

Yet another implementation includes the first portion of the actuatable component having a first cable connected to selectively move the first portion of the first bracket towards or away from the first portion of the second bracket, and the second portion of the actuatable component including a second cable connected to selectively move the first portion of the second bracket first portion towards or away from the first portion of the first bracket.

Further examples include at least one suction cup connected to the elongated flexible component that selectively attaches the elongated flexible component to the surface having the contour, at least one pressurized air bearing connected to the elongated flexible component that facilitates movement of the elongated flexible component over the surface having the contour, or alternately, at least one support device is coupled to the elongated flexible component, wherein the at least one support device is configured to selectively operate as a vacuum cup that selectively attaches the elongated flexible component to the surface having the contour and a pressurized air bearing that facilitates movement of the elongated flexible component over the surface having the contour.

Still another example implementation of the present disclosure includes an automated processing system for use on a surface having a contour, comprising an elongated flexible component having a first portion and a second portion. An actuatable component is movable between a first position and a second position and having a first portion and a second portion. A first bracket has a first portion and a second portion spaced from the first portion of the first bracket, wherein the first portion of the actuatable component is connected to the first portion of the first bracket, and the first portion of the elongated flexible component is generally fixedly connected to the second portion of the first bracket for movement with and flexure with respect to the first bracket. A second bracket has a first portion and a second portion spaced from the first portion of the second bracket, wherein: the second portion of the actuatable component is connected to the first portion of the second bracket; the second portion of the elongated flexible component is generally fixedly connected to the second portion of the second bracket for movement with and flexure with respect to the second bracket; the actuatable component is configured to induce relative movement between the first bracket and the second bracket upon the actuatable component moving between the first position and the second position; and the elongated flexible component is configured to flex into a contour upon the relative movement between the first bracket and the second bracket. An actuator is provided that selectively moves the actuatable component between the first position and the second position, and at least one end effector is operably connected to the elongated flexible component.

an automated processing system for processing a structure having a contour, including, at least one elongated flexible rail with a first end and a second end and at least one combination suction cup-pressurized air device coupled to the elongated flexible rail. A multi-function end effector is associated with the elongated flexible rail and moveable relative thereto, and means are provided for configuring the elongated flexible rail to conform to the contour of the structure.

Additionally, an example implementation includes a method of using an automated processing system including at least one elongated flexible rail for processing a structure having surface with a contour, with the method including configuring elongated flexible rail to achieve a non-linear shape conforming to the surface with the contour and demountably coupling the elongated flexible rail, as configured to the non-linear shape, to the surface of the structure at a first location. A first processing operation is performed on the structure using the automated processing system, and the elongated flexible rail, configured to the non-linear shape, is decoupled from surface of the structure. Additionally, the method includes automatically maintaining the non-linear shape of the elongated flexible rail while moving the automated processing system from the first location to another location.

In other aspects of the disclosure, a method, system and/or apparatus are provided for conforming processing systems to contours of curved surfaces in an automated manner.

The features, functions and advantages discussed herein may be achieved independently in various example embodiments or may be combined in yet other example embodiments further details of which may be seen with reference to the following description and drawings.

BRIEF DESCRIPTION OF THE DRAWINGS

Figure 1:
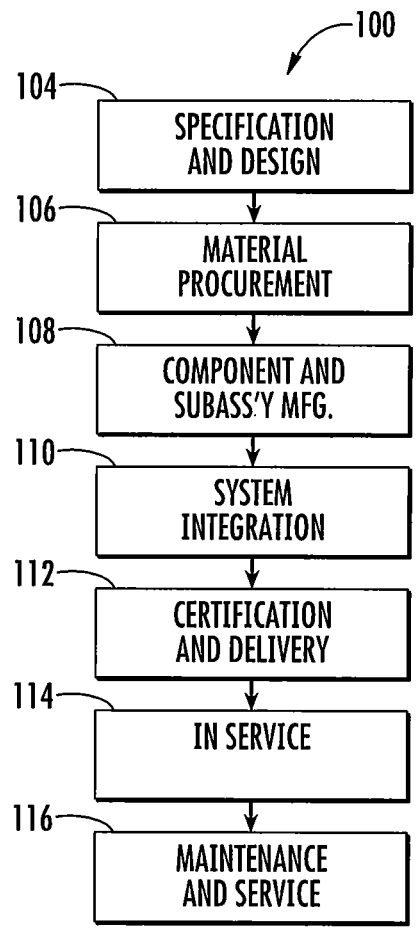
Figure 2:
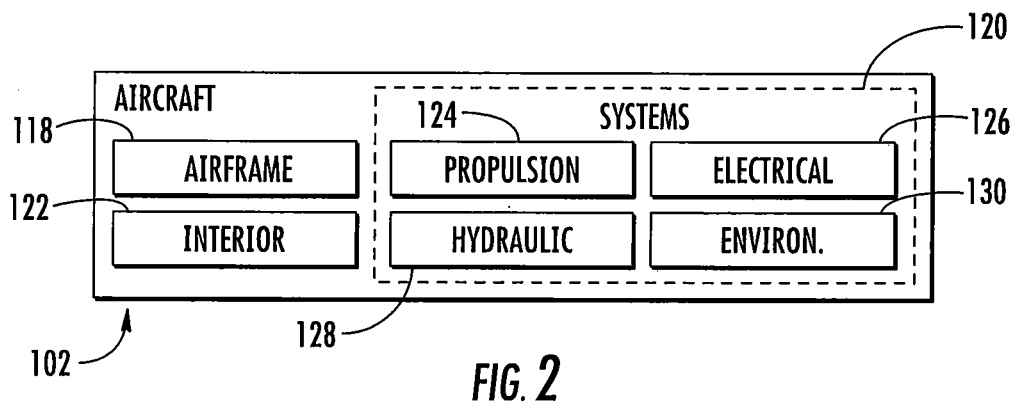
Figure 3:
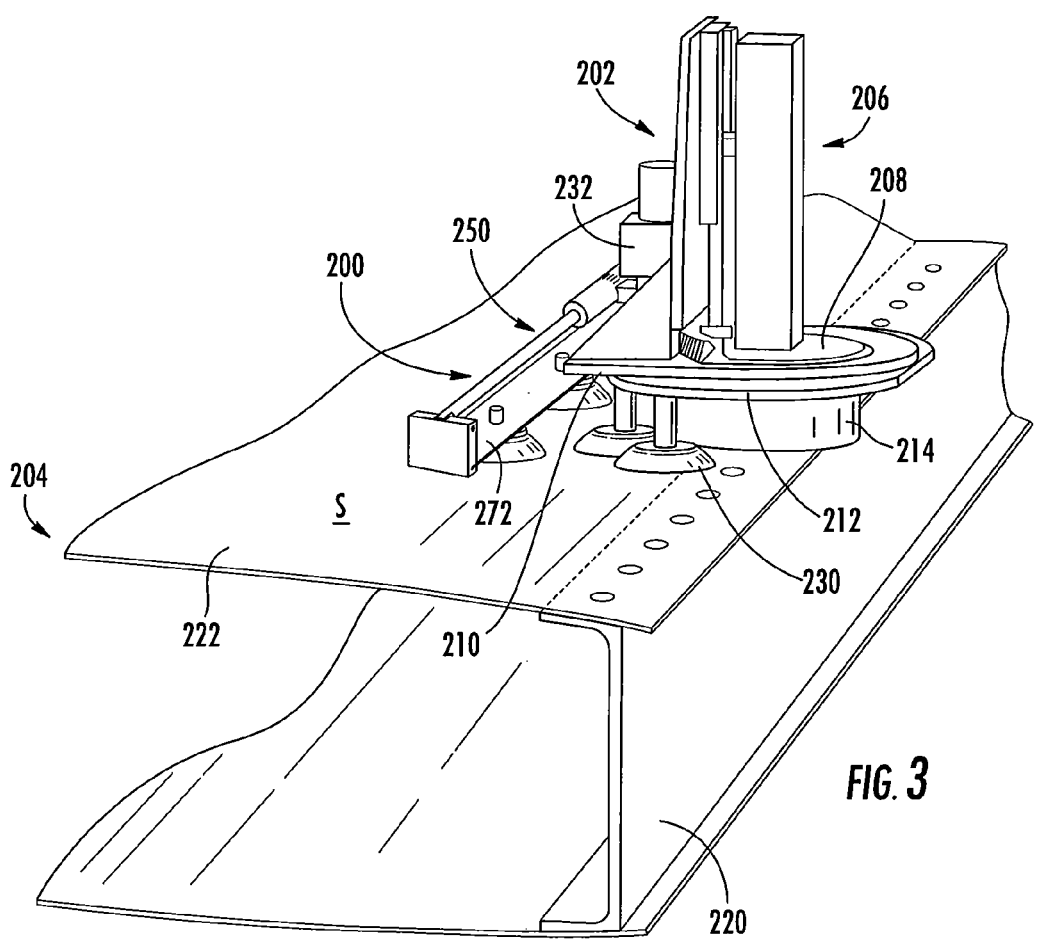
Figure 4:
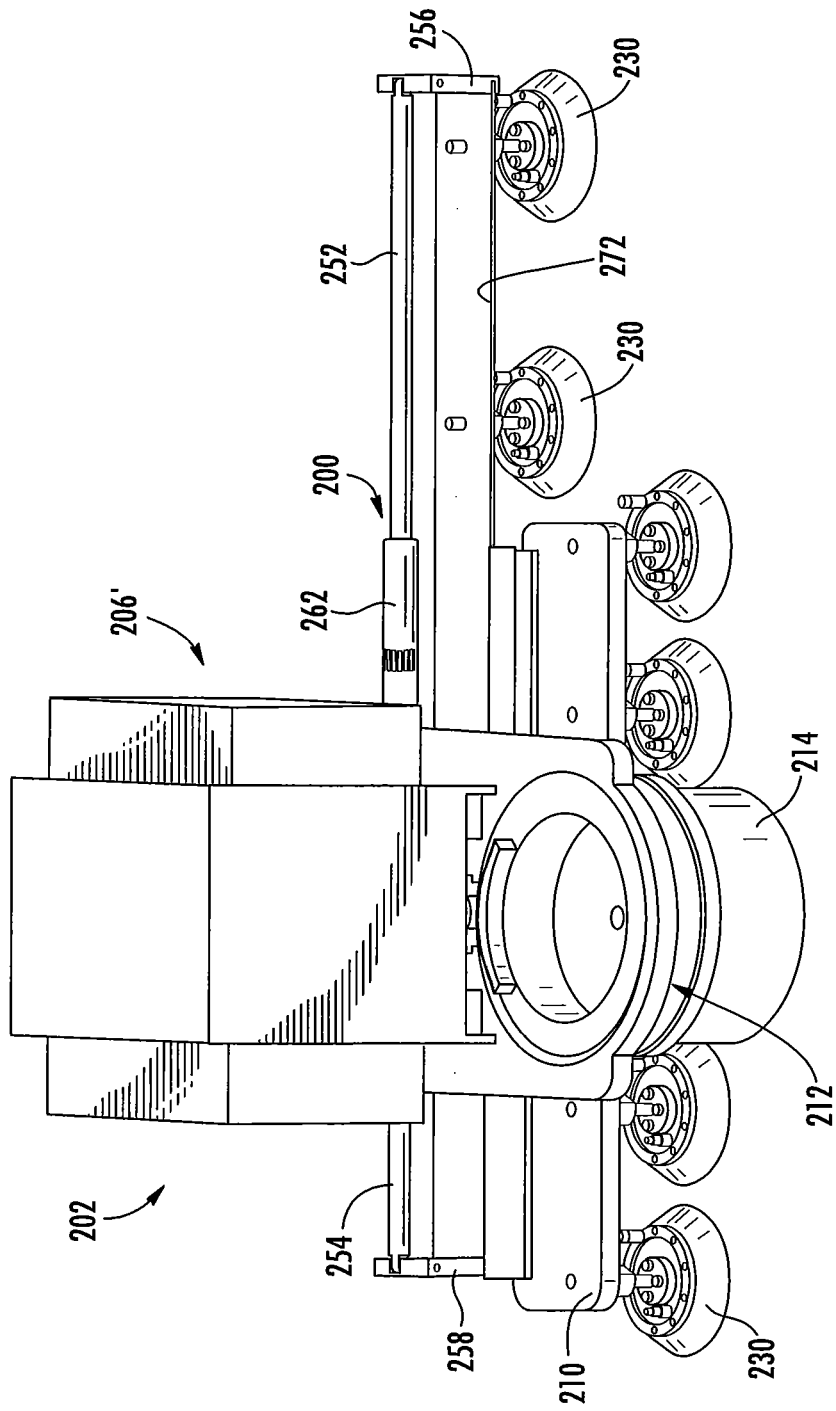
Figure 5:
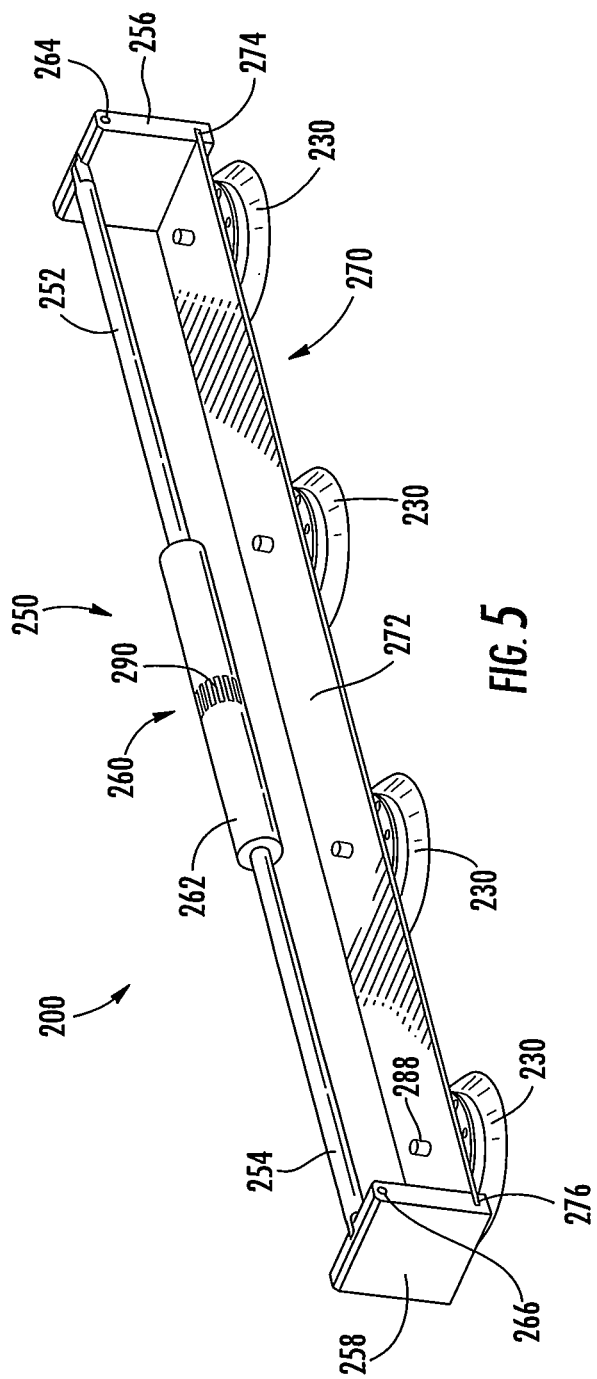
Figure 6A:
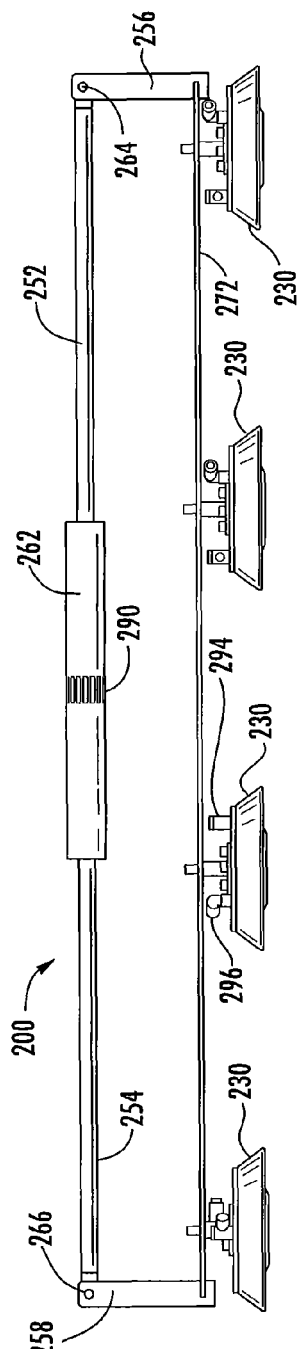
Figure 6B:
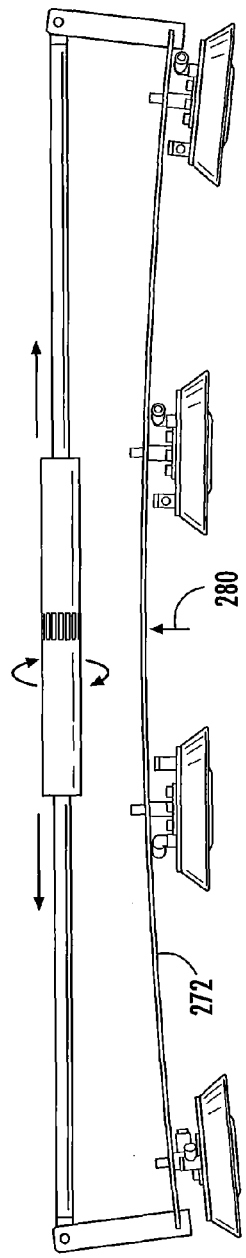
Figure 6C:
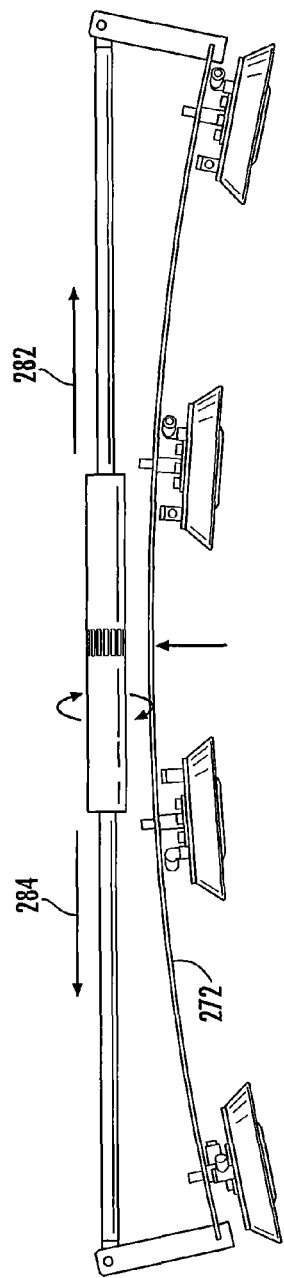
Figure 7A:
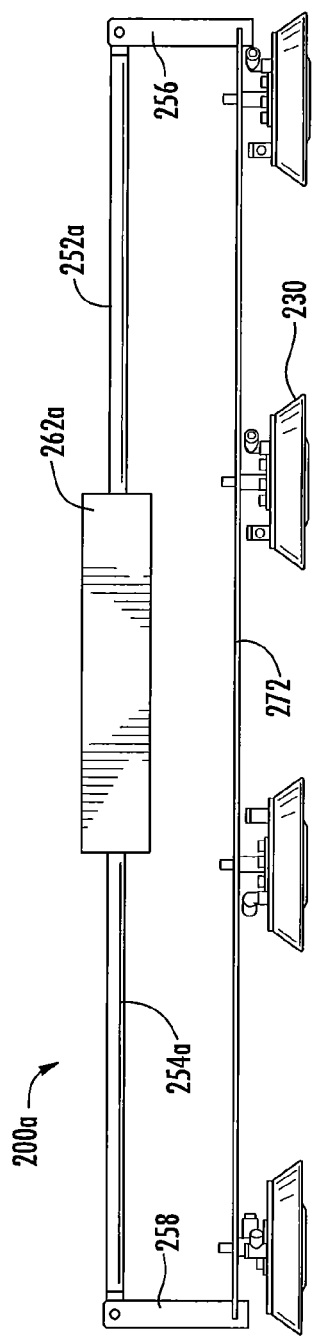
Figure 7B:
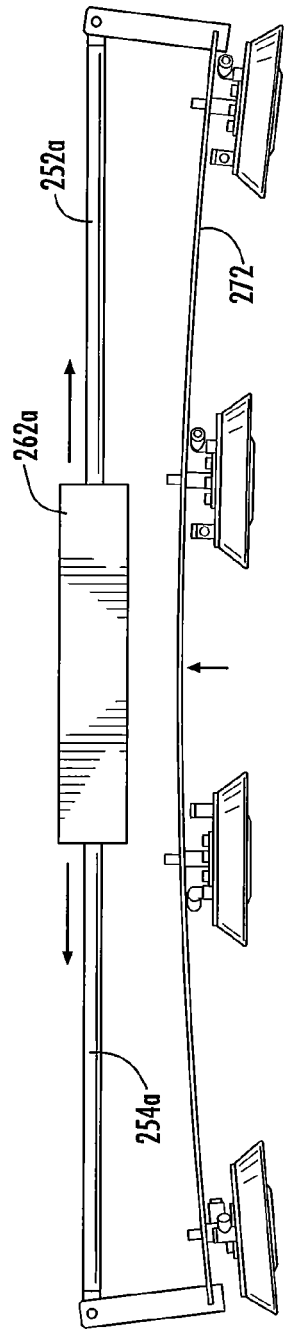
Figure 7C:
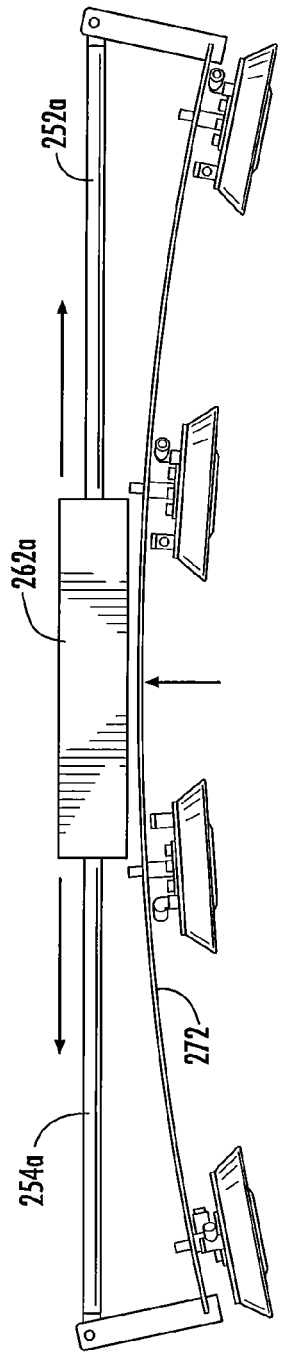
Figure 8A:
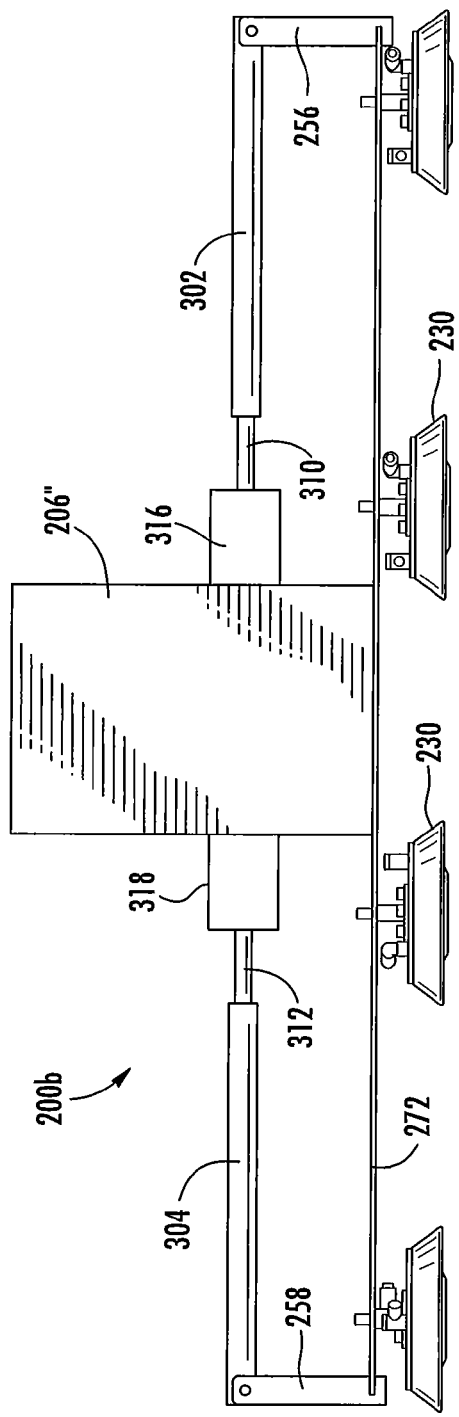
Figure 8B:
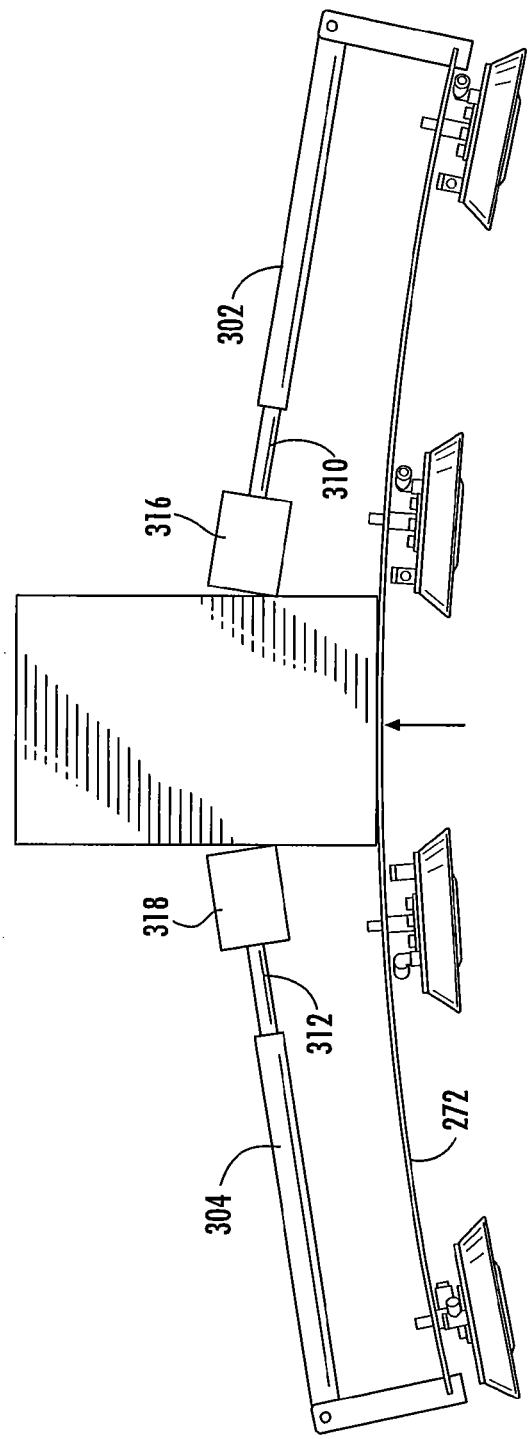
Figure 9A:
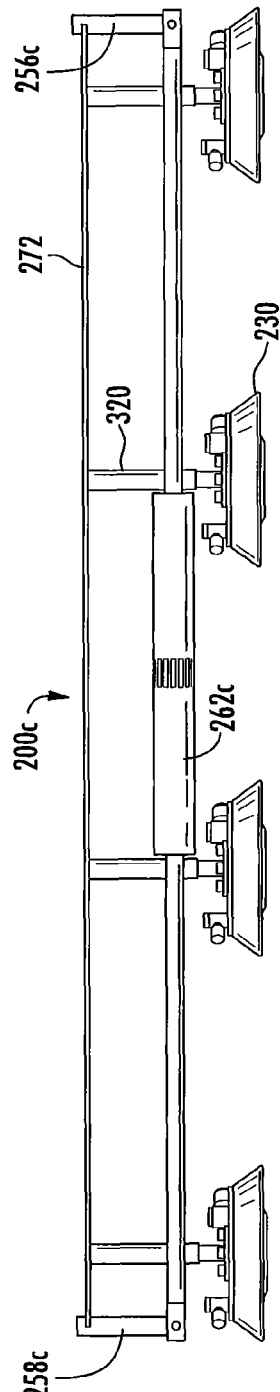
Figure 9B:
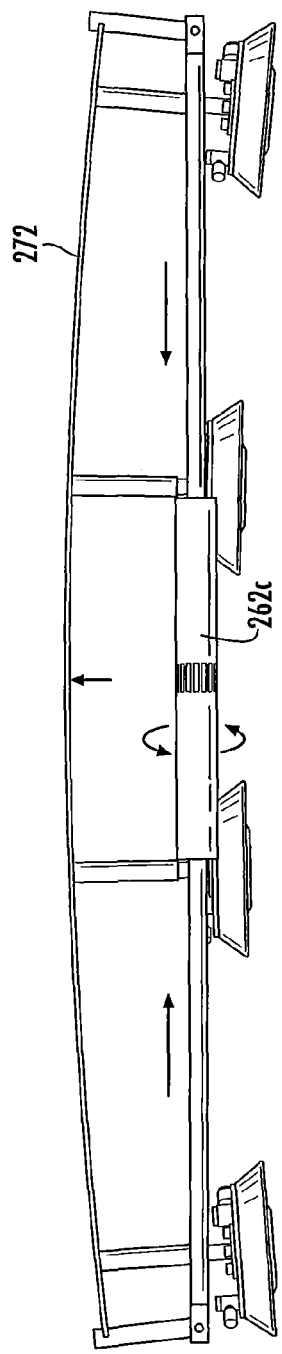
Figure 9C:
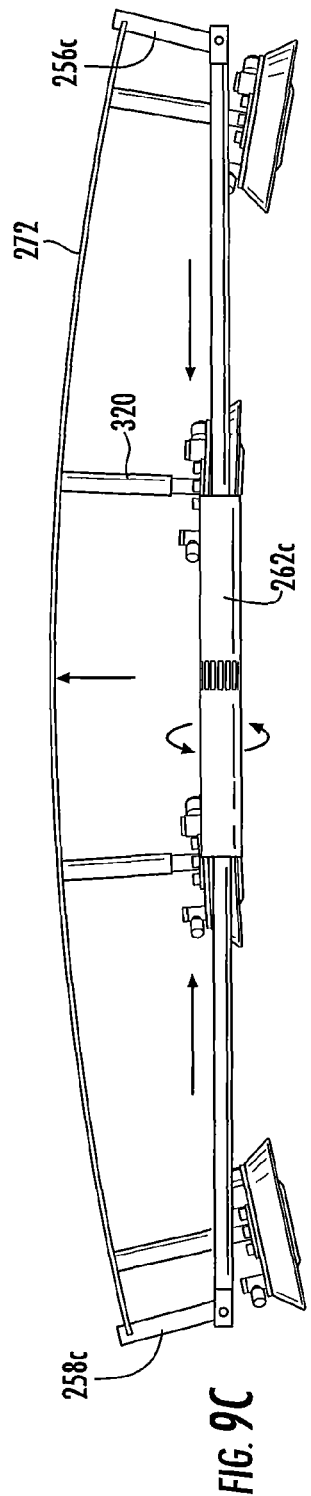
Figure 10A:
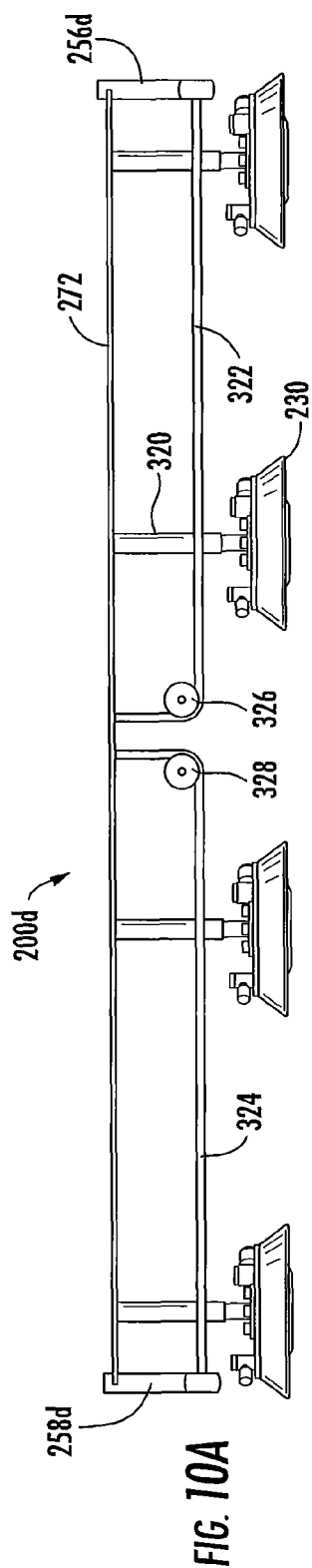
Figure 10B:
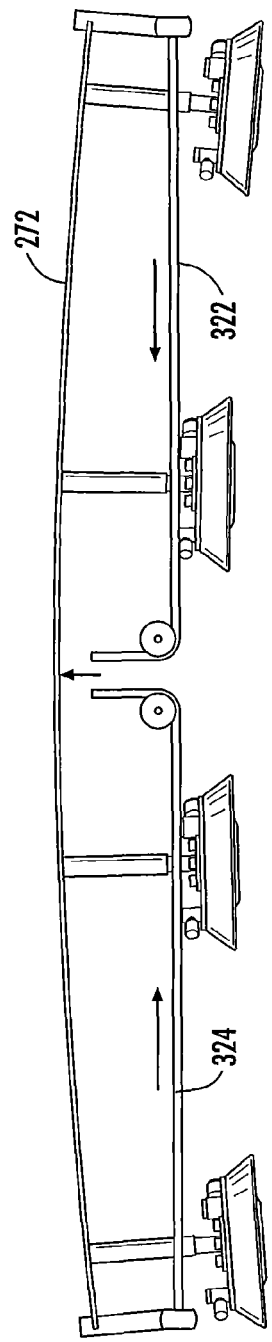
Figure 10C:
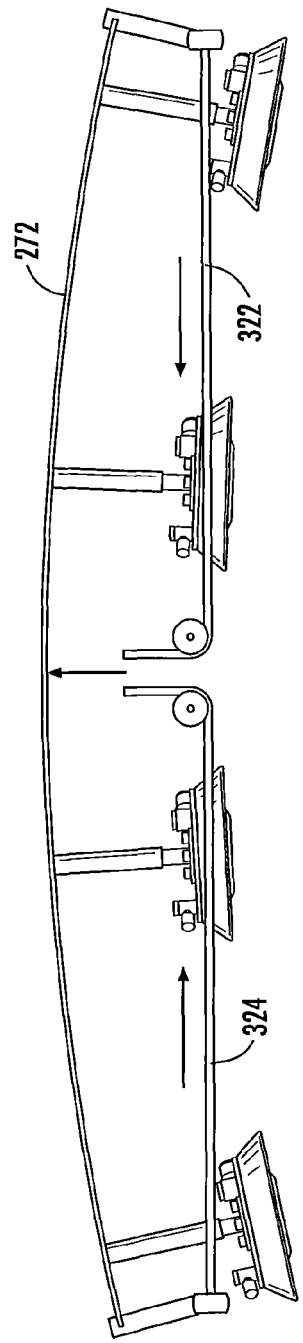

Having thus described exemplary aspects of the disclosure in general terms, reference will now be made to the accompanying drawings, which are not necessarily drawn to scale, and wherein:

FIG. 1 is a flow diagram of aircraft production and service methodology;

FIG. 2 is a block diagram of an aircraft;

FIG. 3 illustrates a processing system including an example system for conforming a processing system to contours of work surfaces;

FIG. 4 illustrates a processing system including an example system for conforming a processing system to contours of work surfaces;

FIG. 5 illustrates an example system for conforming a processing system to contours of work surfaces;

FIG. 6A illustrates in schematic form an example system for conforming a processing system to contours of work surfaces, in use in connection with a relatively flat contour of a work surface;

FIG. 6B illustrates in schematic form the example system for conforming a processing system shown in FIG. 6A, in use in connection with a relatively slightly curved contour of a work surface;

FIG. 6C illustrates in schematic form the example system for conforming a processing system shown in FIG. 6A, in use in connection with a relatively moderately curved contour of a work surface;

FIG. 7A illustrates in schematic form another example system for conforming a processing system to contours of work surfaces, in use in connection with a relatively flat contour of a work surface;

FIG. 7B illustrates in schematic form the example system for conforming a processing system shown in FIG. 7A, in use in connection with a relatively slightly curved contour of a work surface;

FIG. 7C illustrates in schematic form the example system for conforming a processing system shown in FIG. 7A, in use in connection with a relatively moderately curved contour of a work surface;

FIG. 8A illustrates in schematic form still another example system for conforming a processing system to contours of work surfaces, in use in connection with a relatively flat contour of a work surface;

FIG. 8B illustrates in schematic form the example system for conforming a processing system shown in FIG. 8A, in use in connection with a relatively moderately curved contour of a work surface;

FIG. 9A illustrates in schematic form yet another example system for conforming a processing system to contours of work surfaces, in use in connection with a relatively flat contour of a work surface;

FIG. 9B illustrates in schematic form the example system for conforming a processing system shown in FIG. 9A, in use in connection with a relatively slightly curved contour of a work surface;

FIG. 9C illustrates in schematic form the example system for conforming a processing system shown in FIG. 9A, in use in connection with a relatively moderately curved contour of a work surface;

FIG. 10A illustrates in schematic form a further example system for conforming a processing system to contours of work surfaces, in use in connection with a relatively flat contour of a work surface;

FIG. 10B illustrates in schematic form the example system for conforming a processing system shown in FIG. 10A, in use in connection with a relatively slightly curved contour of a work surface; and FIG. 10C illustrates in schematic form the example system for conforming a processing system shown in FIG. 10A, in use in connection with a relatively moderately curved contour of a work surface.

DETAILED DESCRIPTION

Some examples of the present disclosure will now be described more fully hereinafter with reference to the accompanying drawings, in which some, but not all examples of the disclosure are shown. Indeed, various aspects of the disclosure may be embodied in many different forms and should not be construed as limited to the examples set forth herein. Rather, these examples are provided so that this disclosure will be thorough and complete and will fully convey the scope of the disclosure to those skilled in the art. Like reference numerals refer to like elements throughout.

As used herein the terms "circuits" and "circuitry" refer to physical electronic components (i.e. hardware) and any software and/or firmware ("code") which may configure the hardware, be executed by the hardware, and or otherwise be associated with the hardware. Also, as used herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. Further, as used herein, the terms "block" and "module" refer to functions than can be performed by one or more circuits. Additionally, as used herein, the term "exemplary" means serving as a non-limiting example, instance, or illustration. Moreover, as used herein, the term, for example, or "e.g.," introduces a list of one or more non-limiting examples, instances, or illustrations.

As discussed below, examples of the present disclosure include methods and systems for configuring a processing system to conform to a contoured surface of a structure. One example includes an automated processing system, which is readily relocatable when the need arises for it to be moved to another work area. At least one elongated flexible rail may be connected to the automated processing system and may include various configurations, including turnbuckles and/or other actuators, which configure and hold the elongated flexible rail into conformity with the contoured surface (which could be flat or of a curvature) during processing by the automated processing system. In multiple examples, one or more elongated flexible rails and combination suction cup-pressurized air devices may be coupled to the elongated flexible rails. The suction cup-pressurized air devices selectively attach the elongated flexible rails to contoured surfaces and also selectively release and/or facilitate elevation and movement of the elongated flexible rails above and about such contoured surfaces. A multi-function end effector may be associated with the elongated flexible rails and be moveable relative thereto.

Referring more particularly to the drawings, examples of the present disclosure include methods and systems for configuring a processing system to conform to structural contours which may be described in the context of an aircraft manufacturing and service method 100, as shown in FIG. 1, and an aircraft 102, as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include, without limitation, any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to the production process stage 108 may be fabricated or manufactured in a manner similar to components or subassemblies produced while the aircraft 102 is in service. Also, one or more apparatus examples, method examples, or a combination thereof may be utilized during the production stages 108 and 110, for example, by substantially expediting assembly of or reducing the cost of an aircraft 102. Similarly, one or more of apparatus examples, method examples, or a combination thereof may be utilized while the aircraft 102 is in service, for example and without limitation, for maintenance and service 116.

The present disclosure is applicable in the context of an aircraft manufacturing and service method 100, or in other manufacturing environments, such as the automotive sector, heavy industry sector, and surface and submarine vessel maritime sector.

Referring to one example implementation of the present disclosure, FIGS. 3 and 4 illustrate an exemplary processing system which may be used during assembly of component(s), such as during manufacturing of aircraft, during maintenance operations, servicing, etc. In an example, an automatic processing system, generally 202, comprises an apparatus, generally 200, which includes an elongated flexible component which may comprise at least one flexible rail, generally 272, that may easily be relocated when the need arises for moving processing system 202 to be moved to another work area. Various actuatable components, generally 250, may be provided which may include configurations such as a turnbuckles, generally 262, 262c (FIGS. 9A-9C) and/or other actuators, which shape and hold flexible rail 272 into conformity with a contoured surface (which could be flat or of a curvature) of a structure during processing by processing system 202. In multiple examples, apparatus 200 may include one or more flexible rails and combination suction cup-pressurized air devices, generally 230, that may be coupled to the flexible rails. The suction cup-pressurized air devices selectively attach the flexible rails to contoured surfaces and also selectively release and/or facilitate elevation and movement of the flexible rails above and about such contoured surfaces. Processing system 202 may include one or more multi-function end effectors, generally 206 or 206' (FIGS. 3 and 4), that may be associated with the flexible rail 272 and be moveable relative thereto.

The processing system 202 may be a portable, automated motorized device which may be operable to move a physical target, such as an assembly or component that may be used in performing particular operations (e.g., a drilling, bolting, and/or fastening), in a controlled manner. For example, the processing system 202 may be used during manufacturing and/or assembly of aircraft or components thereof (e.g., fuselage or wings). In this regard, the processing system 202 may preferably be associated with a work surface S, which could be flat or contoured, of a structure, such as an aircraft wing 204 (or some other aircraft surface or structure) and may then be moved to various locations along the structure 204 while performing manufacturing operations (e.g., formation of holes) thereon.

The processing system 202 may comprise a plurality of components performing various operations in support of intended functions of the processing system 202. For example, the processing system 202 may comprise a multi-function end effector 206 or 206', as shown in FIGS. 3 and 4, respectively, a pivoting assembly 208, a first movement assembly 210, a second movement assembly 212, and a clamping component 214. The multi-function end effector 206 may be configured to perform one or more fabrication-related operations or functions, which may be utilized during manufacturing of assemblies, such as aircraft or components thereof. For example, the multi-function end effector 206 may be configured to perform such operations as drilling bolt holes and/or applying fastening bolts. These and other operations may be performed, for example, during fabrication of aircraft assemblies and sub-assemblies, such as the fuselage, a wing, airfoil surface, etc. For instance, operations carried out by the multi-function end effector 206 on a wing 204 may enable bolting a spar 220 to a wing box 222.

The first movement assembly 210 and the second movement assembly 212 may enable, individually and/or in combination, moving the processing system 202 along the structure (e.g., the wing 204, or more specifically the wing box 222) to which the operations of the multi-function end effector 206 may be applied. In this regard, the first movement assembly 210 and the second movement assembly 212 may be configured to provide, while operating individually and/or in combination, autonomous movement of the processing system 202, in a controlled manner that may enable optimizing operation of the processing system 202 (and/or operations performed thereby—e.g., assembly related operations), such as by enhancing speed of movement of the processing system 202 without compromising (or even with improvement to) the holding (or securing of) the processing system 202 to the structure 204. This may be achieved, for example, by incorporating into each of the first movement assembly 210 and the second movement assembly 212 a plurality of dual-function movement components 230. In this regard, each dual-function movement component 230 may be configured to provide multiple functions related to support and movement of the processing system 202. The dual-function movement component 230 may be configured to provide, for example, an adhering or a holding function (e.g., relating to securing the processing system 202 to the structure being processed), and a gliding or a hovering function (e.g., relating to moving the crawling over the structured being traversed). For example, the dual function movement component 230 may comprise a suction cup/air bearing assembly that may be configured to provide a securing function—i.e., enabling 'holding' the corresponding movement assembly (first or second)—by use of vacuum created via the suction cup; and to provide the 'gliding' or 'hovering' function—i.e., facilitating moving or sliding of the corresponding movement assembly (first or second)—by use of air bearing (e.g., hovering) over the structure.

In some instances, to enhance use of the movement components of the processing system 202 (e.g., the first movement assembly 210 and the second movement assembly 212), the processing system 202 may comprise pivoting configurations or means (e.g., the pivoting assembly 208), which may be used to allow for (when needed) rotating of particular components of the processing system 202, preferable in a controlled manner and/or independent of other components of the processing system 202. For example, the pivoting assembly 208 may comprise one or more pivoting components, which may allow for rotating or pivoting of particular components of the processing system 202, such as the multi-function end effector 206, the first movement assembly 210, and/or the second movement assembly 212 which may allow for rotating one or more of these components while the other component(s) or the processing system 202 is secured to the structure. Doing so may enhance movement of the processing system 202, such as by allowing at least part of any required movement adjustments to be performed while the processing system 202 is being utilized for its intended function (e.g., while the multi-function end effector 206 is being utilizing to apply assembling related functions). To further enhance operation of the processing system 202, a rotation actuator 232 may be incorporated into the pivoting assembly 208, which may ensure the multi-function end effector 206 remains unmoved (e.g., while it is being utilizing to apply assembling related functions) even while one or both of the first movement assembly 210 and the second movement assembly 212 may be rotated or pivoted.

In an implementation, the processing system 202 may comprise clamping or securing configurations or means (e.g., the clamping component 214), which may be used to ensure that the multi-function end effector 206 is firmly secured to the structure 204 to which the processing operations are applied by the multi-function end effector 206. For example, the clamping component 214 may comprise a non-permanent magnet which may be activated (e.g., using electric current) when the multi-function end effector 206 needs to be secured to the structure (e.g., when the multi-function end effector 206 is positioned at a location on the wing box 222 where a fastening bolt is to be applied); otherwise, the magnet which may be deactivated, such as when the processing system 202 (or parts thereof, such as the multi-function end effector 206) may be moving.

In an implementation, the processing system 202 may also comprise one or more motors (not shown), which may be utilized to enable and/or support the automated motorized movement of the processing system 202, such as by driving and/or enabling functions of at least some of components of the processing system 202 used in conjunction with movement and/or use of the processing system 202 (e.g., rotating/securing component of the multi-function end effector 206, the first movement assembly 210, and/or second movement assembly 212).

In an example implementation, the processing system 202 may comprise a controller component (not shown) for controlling various operations and/or components of the processing system 202. In this regard, the controller component may comprise a programmable circuitry providing control signals to at least some of the components of the processing system 202, to enable configuring these components to perform various operations in support of the functions of the processing system 202. For example, the controller component may control operations of the movement component of the processing system 202.

The processing system 202 may be configured to receive and/or transmit information, such as by incorporating a communication component for providing and/or handling communications to and/or from the processing system 202. In this regard, the processing system 202 may receive, for example, user input, which may be used in controlling and/or adjusting various operations or functions of the processing system 202. The user input may comprise, for example, movement related commands, such as "start" or "stop" and/or other similar commands. The communication component may also be configured to enable transmitting status information, such as information relating to various components or functions of the processing system 202. The status information may be transmitted to other devices that may be utilized by users (e.g., a computer). The reception and/or transmission may be performed wirelessly, using one or more appropriate technologies. For example, communications may be via infra-red (IR) signals, near field communication (NFC) signals, Bluetooth signals, and/or Wi-Fi signals. This disclosure is not limited, however, to any particular communication technology.

Turning now to FIG. 5, an example implementation of apparatus 200 is shown isolated from processing system 202. Apparatus 200 includes means for configuring the flexible rail 272 to conform to the contour of a structure to be processed, e.g., a generally rigid elongated actuatable component, generally 250, which includes, in one example, first and second elongated, generally rigid members, such as a pushrods, rods or shafts 252, 254. The first, or proximal, end of each rod 252, 254, respectively, is pivotally attached to an upstanding component, such as a bracket. As used herein, "bracket" refers to a structure that can include a variety of shapes and configurations and is not limited to the structure shown in the drawings.

More specifically, the first end of rod 252 is pivotally attached to a bracket 256, and the first end of rod 254 is pivotally attached to a bracket 258. Brackets 256, 258 are generally rigid in structure and could take on various other configurations, shapes, and profiles, other than depicted in drawings hereof, if desired. The second, or distal, end of each rod 252, 254 is threadingly connected into an actuator, generally 260, which in the case of the example shown in FIGS. 5, 6A, 6B, 6C, 9A, 9B, and 9C, is a turnbuckle device. The second end of rod 252 is threaded in one direction, and the second end of rod 254 is threaded in the opposite direction, to cooperate with matching threads in each respective end of turnbuckle 262, such that rotation of turnbuckle 262 in a first direction forces rods 252, 254 outwardly from turnbuckle 262, and consequently, causes the first, or upper ends, of each bracket 256, 258 to move apart from one another. Rotation of turnbuckle 262 in the opposite direction causes, due to the threading engagement of turnbuckle 262 with the second ends of rods 252, 254, to be drawn into actuator 262, and thereby pulls the second end of rods 252, 254 towards one another, which correspondingly causes the upper end of brackets 256, 258, to be drawn towards one another. The first end of each rod 252, 254 is constrained from rotation with respect to bracket 256, 258, respectively, and because of this, as turnbuckle 262 rotates, rods 252, 254 correspondingly move longitudinally inward or outward from turnbuckle 262, depending on the direction or rotation of turnbuckle 262.

It is to be noted that as brackets 256, 258 are pushed apart by rods 252, 254 (due to the rotation of turnbuckle 262), or pulled towards one another (again, due to rotation of turnbuckle 262), the first end of each rod 252, 254 is allowed to pivot with respect to the respective upper end of a bracket 256, 258 due to the pivotal connection of the first end of each rod 252, 254 about a respective pivot 264, 266, provided in the upper end of each bracket 256, 258. Pivots 264, 266 could be pins, sleeves, swivels, etc. as desired.

An elongated flexible portion, generally 270, is provided, which could be in the form of a flexible sheet, rail, bar, rod, and/or one or more of the foregoing, and as used herein, "rail" refers to each of the foregoing and also to elongated components of some other shape, profile or configuration than is depicted in the example limitation in figures. In one example implementation, flexible portion 270 is depicted in the form of the flexible rail 272. Flexible rail 272 includes a first end portion 274 and a second end portion 276, generally opposite one another, and each end portion 274, 276 is generally fixedly attached to a second, or lower, portion of a bracket 256, 258, respectively. The connection of ends 274, 276 to brackets 256, 258 is such that as brackets 256, 258 are moved apart form one another or towards one another, via the rotation of turnbuckle 262 as discussed above, flexing or bending forces are induced along the length of flexible rail 272. Due to the flexible nature of flexible rail, which could, in one implementation, be spring steel, fiberglass, etc., bends generally uniformly along its length. Such flexure or bending is depicted schematically in FIGS. 6A and 6C, wherein turnbuckle 262, when rotated in a first direction, forces rods 252, 254 outwardly with respect to one another, which in turn forces the upper end of each of bracket 256, 258 outwardly from one another.

As shown in FIG. 6B, this induces a slight curvature, or bowing, in flexible rail 272, with the central portion of flexible rail 272 moving upwardly in the direction of arrow 280, and, accordingly, causing flexible rail 272 to flex into a contour which may approximate and generally conform to surface S of the structure. FIG. 6C illustrates that further rotation of turnbuckle 262 in the same direction forces rods 252, 254 further outwardly, in the direction of arrows 282, 284, which in turn causes the central portion of flexible rail 272 to move further upwardly and for flexible rail 272 to bow further along its length. This ability to induce a curvature along the length of flexible rail 272 allows for dual function suction, or vacuum, cup/air bearing components 230, which are generally fixedly attached to flexible rail 272 via fasteners 288, to move with flexible rail 272 as flexible rail 272 bows upwardly or takes on less curvature, depending on the direction and the extent of rotation of turnbuckle 262. This is to say that the dual function movement components 230 can be adjusted to conform to the curvature of a surface S, such as the surface of a wing, airfoil, fuselage, etc. of an aircraft, or some other equipment or structure, by virtue of controlling the rotation of turnbuckle 262.

Turnbuckle 262 can be rotated manually, or preferably, in an automated manner via a motor (such as a servo motor) and gearing arrangement (not shown) which could mate with gear teeth 290 provided about the circumference of turnbuckle 262. Rotation of turnbuckle 262 in the opposite direction reduces the bowing of flexible rail 272 and causes it to straighten. Continued rotation of turnbuckle 262 in such direction will eventually cause flexible rail 272 to become flat, with substantially no curvature, and even further rotation of turnbuckle 262 in such direction would cause flexible rail 272 to bow outwardly in the opposite direction.

It is to be noted that due to the stiffness afforded by the elongated actuator portion 250, once flexible rail 272 has been conformed to a surface, a generally rigid structure is provided, such that as vacuum is applied via port 294 to the vacuum cup portion of dual function components 230, a downward force can be generally uniformly placed along the length of flexible rail 272. Accordingly, due to the connection of surface conforming apparatus 200 to automated processing system 202, apparatus 200 can be securely held in place for allowing an end effector, such as end effector 206 (FIG. 3) and/or end effector 206' (FIG. 4) to operate and perform one or more assembly functions. When it is necessary to move processing system 202, and the vacuum cup portions of components 230 are released, and the pressurized air bearing portion of components 230 are energized by pressurized air being provided via port 296. Because of the generally stiff structure provided by apparatus 200, enabled by constraint of the upper portion of brackets 256, 258 via the generally rigid bracing of rods 252, 254 and turnbuckle 262, flexible rail 272 is able to rigidly support the weight of apparatus 200 as air bearing portion of components 230 generally uniform elevation of apparatus 200 and processing system 202 as necessary for selective movement of apparatus 200.

Although the drawings show that the automated processing system 202 includes only one apparatus 200, it is to be understood that the system 202 may include multiple apparatuses 200, oriented in varying configurations and orientations with respect to one another, if desired.

The ability of apparatus 200 to conform the rail 272 to the curvature of a surface can be automated, with the operation thereof being controlled by the controller component (not shown) used in connection with the processing system 202, as discussed above. By automating the conforming of apparatus 200 to a surface, the need for the potentially labor-intensive manually forming a support rail may potentially be eliminated altogether.

FIGS. 7A through 7C illustrate in schematic form another example system, generally 200a, of an implementation of the present disclosure, wherein an adjuster 262a is provided. Adjuster 262a could include a rack and pinion type device, wherein the second end of each rod 252a, 254a are provided with generally flat gearing rack portion (not shown) and one or more pinions (not shown), which could be provided on and/or within adjuster 262a. Such pinion, in one implementation, could be powered by a motor, such as a servo motor (not shown) which could be reversible, such that rotation of the pinion in one direction would cause both of the second ends of rods 252a, 254a to be drawn towards one another, thereby moving the upper ends of brackets 256, 258 towards one another. Similarly, the pinion could be rotated in the opposite direction, which could drive the rack portion on the second end of each rod 252a, 254a outwardly with respect to adjuster 262a such that the upper end of brackets 256, 258 are moved apart from one another. Alternately, one or more pinions could be provided for each end of rods 252a, 254a and the pinions controlled to drive rods 252a, 254a independently with respect to one another. It is to be understood, in view of the discussion above, the movement of the upper ends of brackets 256, 258 toward and away from one another through use of adjuster 262a results in the corresponding curvature being formed or diminished (or eliminated altogether) in flexible rail 272. Thus, apparatus 200a operates in a manner similar to that of apparatus 200, discussed above, to provide curvature conformation of the rail 272 with respect to a desired surface to which the automated processing system 202 is to be coupled.

FIGS. 8A and 8B illustrate in schematic form another example system, generally 200b, of the present disclosure. In this example implementation of the disclosure, an end effector, generally 206", can be provided against which elongated components 302, 304 bear. Elongated components 302, 304 could be fluid-actuated piston-cylinder devices in the form of pneumatic and/or hydraulic cylinders, each having a cylinder portion, 306, 308, respectively. Extended outwardly from cylinder 306 is a piston rod 310, and similarly, extending outwardly from cylinder 308 is a piston rod 312. Upon actuation of elongated components 302, 304, piston rods 310, 312 bear against abutment components 316, 318, respectively, to effectively move the upper portion of brackets 256, 258 apart from one another to induce bowing of flexible rail 272, as shown in FIG. 8B. Abutment components 316, 318 could be configured, as shown in FIG. 8B, to pivot with respect to end effector 206" in response to the rectilinearly applied force of elongated portions 302, 304. Again, as with apparatuses 200 and 200a, the bowing, or curvature, induced in flexible rail 272 may be adjusted to conform to a contoured surface in order for secure attachment of a processing system to a surface for ultimate actuation of end effector 206". It is to be understood that instead of elongated portions 302, 304, being pneumatic and/or hydraulic cylinder arrangements, they could include motorized devices, wherein one or more members 316, 318 could include first and second motors, respectively, such as servo motors with gearing (not shown) which could engage with a rack portion (not shown) on the second end of each rod 310, 312, respectively, to selectively drive rods 310, 312 outwardly therefrom (which, as shown in FIGS. 8A and 8B, would result in the upper ends of brackets 256, 258 moving apart from one another for inducing a curvature in flexible rail 272) or be drawn inwardly (which would cause the upper ends of brackets 256, 258 to move towards one another and would result in removing curvature induced in flexible rail 272).

FIGS. 9A through 9C illustrate in schematic form yet another example implementation of a apparatus 200c of the present disclosure. Apparatus 200c is similar to apparatus 200, except that in this implementation, the elongated actuation portion is positioned between dual function movement components 230 and flexible rail 272. In this example, turnbuckle 262c is provided, and as shown in FIG. 9B when turnbuckle 262c is rotated in the first direction, the upper ends of brackets 256c and 258c are drawn together, which induces an outward bowing of flexible rail 272 in the direction of arrow 80c. Further rotation of turnbuckle 262 in the same direction induces further bowing of flexible rail 272, as shown in FIG. 9C. Dual function movement components 230, in this implementation, extend downwardly from flexible rail 272 via shafts 320 and respond to the bowing of flexible rail 272 to allow attachment of automated processing system 202 to a curved surface as components 230 are so-conformed to such surface.

FIGS. 10A through 10C illustrate in schematic form a further aspect of the disclosure, namely, an apparatus 200d. In this implementation, dual function movement components 230 are attached to rods 320d, which, in turn, are fixedly attached to flexible rail 272. Flexible rail 272 is connected at each end to a bracket 256d, 258d, respectively. At the other end of each bracket 256d, 258d, an elongated flexible member, such as a cable, rope, cord, line, etc., generally 322, 324, is connected. Cables 322, 324 engage a guide, sheave, pulley, or the like, generally 326, 328, respectively, and are configured such that as the ends of cables 330, 332 respectively, are pulled in the direction of arrow 334, the end of brackets 256d, 258d (to which each cable 322, 324 is respectively connected) is pulled inwardly toward one another. This induces an outward bowing of flexible rail 272, as shown in FIG. 10B, and at the same time causes a drawing of dual function movement component 230 into a configuration for conforming to a generally concave surface (not shown). As shown in FIG. 10C, continued pulling of the ends 330, 332 of cables 322, 324, respectively, causes further bowing of flexible rail 272 and an orientation of dual function movement components 230 for conforming into an engagement with a surface of greater concavity. The pulling of cables 322, 324 could be accomplished by one or more devices (not shown) such as winches or similar devices, fluid-actuated piston-cylinder devices, etc.

Many modifications and other examples of the disclosure set forth herein will come to mind to those skilled in the art to which this disclosure pertains, having the benefit of the teachings presented in the foregoing descriptions and the associated drawings. Therefore, it is to be understood that the disclosure is not to be limited to the specific examples disclosed and that modifications and other embodiments are intended to be included within the scope of the appended claims. Moreover, although the foregoing descriptions and the associated drawings describe aspects of the disclosure in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for use in connection with a processing system on a surface having a contour, the apparatus comprising:
   an elongated flexible component having a first portion and a second portion;
   an actuatable component movable between a first position and a second position and having a first generally rigid portion and a second generally rigid portion;
   a first bracket having a first portion and a second portion spaced from the first portion of the first bracket, wherein the first portion of the actuatable component is connected to the first portion of the first bracket, and the first portion of the elongated flexible component is generally fixedly connected to the second portion of the first bracket for movement with and flexure with respect to the first bracket;
   a second bracket having a first portion and a second portion spaced from the first portion of the second bracket, wherein: the second portion of the actuatable component is connected to the first portion of the second bracket; the second portion of the elongated flexible component is generally fixedly connected to the second portion of the second bracket for movement with and flexure with respect to the second bracket; the actuatable component is configured to induce relative movement between the first bracket and the second bracket upon the actuatable component moving between the first position and the second position; and the elongated flexible component is configured to flex into a contour upon the relative movement between the first bracket and the second bracket;
   an actuator that selectively moves the actuatable component between the first position and the second position; and
   a turnbuckle threadingly connected to both the first portion and the second portion of the actuatable component, wherein the turnbuckle is configured, upon selective rotation thereof, to simultaneously move the first portion of the actuatable component and the second portion of the actuatable component outwardly relative to the turnbuckle or inwardly relative to the turnbuckle.

2. The apparatus of claim 1, wherein:
   the actuatable component, the first bracket, the second bracket, and the elongated flexible component are configured such that upon the actuatable component moving between the first position and the second position, the first portion of the first bracket and the first portion of the second bracket move away from one another, and the second portion of the first bracket and the second portion of the second bracket move towards one another.

3. The apparatus of claim 1, wherein:
   the actuatable component, the first bracket, the second bracket, and the elongated flexible component are configured such that upon the actuatable component moving between the first position and the second position, the first portion of the first bracket and the first portion of the second bracket move towards one another, and the second portion of the first bracket and the second portion of the second bracket move away from one another.

4. The apparatus of claim 1, wherein the first portion and the second portion of the actuatable component are generally rigid.

5. The apparatus of claim 1, further comprising:
a motor drivingly connected to the first portion of the actuatable component and to the second portion of the actuatable component and configured to selectively move the first portion of the actuatable component and the second portion of the actuatable component towards one another or away from one another.

6. The apparatus of claim 1, further comprising:
a first motor drivingly connected to the first portion of the actuatable component;
a second motor drivingly connected to the second portion of the actuatable component; and
the first motor and the second motor being configured to selectively move the first portion of the actuatable component and the second portion of the actuatable component towards one another or away from one another.

7. The apparatus of claim 1, wherein:
the first portion of the actuatable component includes a first fluid-actuated piston-cylinder device having a rod connected to selectively move the first portion of the first bracket towards or away from the first portion of the second bracket; and
the second portion of the actuatable component includes a second fluid-actuated piston-cylinder device having a rod connected to selectively move the first portion of the second bracket towards or away from the first portion of the first bracket.

8. The apparatus of claim 1, wherein:
the first portion of the actuatable component includes a first cable connected to selectively move the first portion of the first bracket towards or away from the first portion of the second bracket; and
the second portion of the actuatable component includes a second cable connected to selectively move the first portion of the second bracket towards or away from the first portion of the first bracket.

9. The apparatus of claim 1, further comprising:
at least one suction cup connected to the elongated flexible component that selectively attaches the elongated flexible component to the surface having the contour.

10. The apparatus of claim 1, further comprising:
at least one pressurized air bearing connected to the elongated flexible component that facilitates movement of the elongated flexible component over the surface having the contour.

11. The apparatus of claim 1, further comprising:
at least one suction cup connected to the elongated flexible component that selectively attaches the elongated flexible component to the surface having the contour; and
at least one pressurized air bearing connected to the elongated flexible component that facilitates movement of the elongated flexible component over the surface having the contour.

12. The apparatus of claim 1, further comprising:
at least one support device coupled to the elongated flexible component, wherein the at least one support device is configured to selectively operate as one of a vacuum cup that selectively attaches the elongated flexible component to the surface having the contour and a pressurized air bearing that facilitates movement of the elongated flexible component over the surface having the contour.

13. A flexible rail of an automated system for processing a structure having a contour, the flexible rail comprising:
a first end and a second end;
combination suction cup-pressurized air devices coupled to the flexible rail;
a generally rigid first bracket including a first proximal end and a first distal end;
a generally rigid second bracket including a second proximal end and a second distal end, wherein the first proximal end of the first bracket is fixed to the first end of the flexible rail and the second proximal end of the second bracket is fixed to the second end of the flexible rail;
a generally rigid first pushrod having a first end and a threaded end, wherein the first end is pivotably coupled to the first distal end of the first rigid bracket;
a generally rigid second pushrod having a second end and a threaded end, wherein the second end is pivotably coupled to the second distal end of the second rigid bracket; and
a turnbuckle operatively coupled to the threaded end of the first pushrod and to the threaded end of the second pushrod.

14. The apparatus of claim 1, further comprising a motor drivingly connected to the turnbuckle for selectively rotating the turnbuckle.

15. The flexible rail of claim 13, further comprising a motor drivingly connected to the turnbuckle for selectively rotating the turnbuckle.

16. The apparatus of claim 1, further comprising a controller component for controlling various operations and/or components of the automated system.

17. The flexible rail of claim 13, further comprising a controller component for controlling various operations and/or components of the automated system.

18. The flexible rail of claim 13, further comprising a multi-function end effector associated with the flexible rail and moveable relative thereto.

19. The flexible rail of claim 13, further comprising means for configuring the flexible rail to conform to the contour of the structure.

20. The flexible rail of claim 13, further comprising a pressurized air bearing that facilitates movement of the flexible rail over the surface having the contour.

* * * * *